United States Patent
Khan et al.

(10) Patent No.: US 8,847,733 B2
(45) Date of Patent: Sep. 30, 2014

(54) METHODS, SYSTEMS, AND COMPUTER-READABLE STORAGE MEDIA FOR MANAGING RISK USING LOCATION, MOBILE, AND USER PARTICIPATING-BASED IDENTITY VERIFICATION

(75) Inventors: Mohammad Anwar Khan, San Jose, CA (US); Dickey Singh, San Carlos, CA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/476,371

(22) Filed: May 21, 2012

(65) Prior Publication Data
US 2012/0293303 A1 Nov. 22, 2012

Related U.S. Application Data

(60) Provisional application No. 61/488,310, filed on May 20, 2011.

(51) Int. Cl.

| | |
|---|---|
| *G06F 7/04* | (2006.01) |
| *G06Q 20/32* | (2012.01) |
| *G06F 21/32* | (2013.01) |
| *G06Q 20/40* | (2012.01) |

(52) U.S. Cl.
CPC ............ *G06F 21/32* (2013.01); *G06Q 20/3224* (2013.01); *G06Q 20/4014* (2013.01); *G06Q 20/40145* (2013.01); *G06Q 20/4016* (2013.01); *G06Q 20/322* (2013.01)
USPC ............................. 340/5.82; 235/382; 705/44

(58) Field of Classification Search
USPC ...................... 340/5.82; 705/44, 38; 713/182; 235/382; 455/406
See application file for complete search history.

(56) References Cited

U.S. PATENT DOCUMENTS 6,353,889 B1   3/2002 Hollingshead
6,470,450 B1 * 10/2002 Langford et al. ............. 713/182
(Continued)

FOREIGN PATENT DOCUMENTS

EP       1 344 418 B1   10/2006
WO   WO 2004/079499 A2    9/2004

OTHER PUBLICATIONS

Communication of European publication number and information on the application of Article 67(3) EPC for European Application No. 12789645.4 (Feb. 26, 2014).
Notification of Transmittal of the International Search Report and the Written Opinion of the International Searching Authority, or the Declaration for International Application No. PCT/US2012/038897 (Nov. 30, 2012).

(Continued)

*Primary Examiner* — Andrew Bee
*Assistant Examiner* — Kaleria Knox
(74) *Attorney, Agent, or Firm* — Jenkins, Wilson, Taylor & Hunt, P.A.

(57) ABSTRACT

The presently disclosed subject matter is directed to methods, systems, and computer-readable storage media for location, mobile, and user participating-based identity verification for the purposes of risk management. In one embodiment, the method, system, and computer-readable storage media includes receiving user data, receiving verification data, and verifying the identity of a user based on the user data and the verification request data. The user data may include location data and/or identity data, and the user data may be received from a mobile device. The identity data may include biometric data regarding the user. The method, system, and computer-readable storage media may include comparing the user data to the verification request data. The method, system, and computer-readable storage media may also include performing an action based on the results of the verification wherein the action is authorizing a payment.

21 Claims, 5 Drawing Sheets

(56) References Cited

U.S. PATENT DOCUMENTS

| | | |
|---|---|---|
| 6,615,191 B1 | 9/2003 | Seeley |
| 7,273,168 B2 | 9/2007 | Linlor |
| 7,314,164 B2 | 1/2008 | Bonalle et al. |
| 7,403,922 B1 * | 7/2008 | Lewis et al. ............... 705/38 |
| 7,469,151 B2 | 12/2008 | Khan et al. |
| 7,503,489 B2 * | 3/2009 | Heffez et al. ............. 235/382 |
| 7,548,886 B2 * | 6/2009 | Kirkland et al. ........... 705/44 |
| 7,948,361 B2 * | 5/2011 | Bennett et al. ........... 340/5.82 |
| 2009/0125401 A1 | 5/2009 | Beenau et al. |
| 2009/0187492 A1 | 7/2009 | Hammad et al. |
| 2009/0234760 A1 | 9/2009 | Walter |
| 2010/0049615 A1 | 2/2010 | Rose et al. |
| 2010/0138345 A1 | 6/2010 | Lekhtman et al. |
| 2011/0047075 A1 | 2/2011 | Fourez |
| 2011/0137804 A1 | 6/2011 | Peterson |

OTHER PUBLICATIONS

"U.S. Retailers Face $191 Billion in Fraud Losses Each Year," http://www.lexisnexis.com/risk/newsevents/press-release.aspx?id=1258571377346174, pp. 1-2 (Nov. 9, 2009).

Oorschot, P.C. van et al., Countering Identity Theft through Digital Uniqueness, Location Cross-Checking, and Funneling, Version: Sep. 16, 2004.

Bell, Stephanie, Visa Europe Using Mobile Phone Location to Prevent Card Fraud, VISA Europe Ltd., VALIDSOFT, CardLine, vol. 10, Issue 50, p. 29, Dec. 3, 2010.

Commonly-assigned, co-pending U.S. Appl. No. 14/262,583 for "Methods, Systems and Computer Readable Media for Determining Criminal Propensities in a Geographic Location Based on Purchase Card Transaction Data," (Unpublished, filed Apr. 25, 2014).

* cited by examiner

METHODS, SYSTEMS, AND COMPUTER-READABLE STORAGE MEDIA FOR MANAGING RISK USING LOCATION, MOBILE, AND USER PARTICIPATING-BASED IDENTITY VERIFICATION

CROSS REFERENCE TO RELATED APPLICATION

This application claims the benefit of U.S. Provisional Patent Application No. 61/488,310, filed May 20, 2011 and titled METHODS, SYSTEMS, AND COMPUTER-READABLE STORAGE MEDIA FOR MANAGING RISK USING LOCATION-BASED IDENTITY VERIFICATION, the content of which is hereby incorporated herein by reference in its entirety.

TECHNICAL FIELD

The subject matter disclosed herein relates to risk management. In particular, the subject matter disclosed herein relates to methods, systems, and computer-readable storage media for managing risk utilizing location, mobile, and user participating-based identity verification.

BACKGROUND

Merchants and financial institutions attribute hundreds of billions of dollars in losses each year directly to identity fraud. Stolen credit cards result in financial losses by consumers and their credit scores may also be adversely affected. Correcting this type of criminal activity is often burdensome for consumers, merchants, and financial institutions alike. Card issuers are seldom able to manage fraud in real time, and by the time the card issuer's system detects potential misuse, a stolen card may be used multiple times in many different locations. A significant amount of damage may have occurred by the time the fraudulent activity is discovered by the card issuer. The process of issuing transaction cards to consumers is also unsafe and is prone to theft and misuse. The process is not completely automated, and it requires the handling of issued cards by multiple parties outside of the card issuer and consumer. Additionally, payment transactions go through a complex system where the card issuer must authorize a payment even though the issuer cannot verify with a great degree of certainty that the card being used in a payment transaction is being used by the card owner. Accordingly, there is a need for an improved system and method of verifying a user's identity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure is directed to methods, systems, and computer-readable storage media for location, mobile, and user participating-based identity verification. In one embodiment, the method, system, and computer-readable storage media includes receiving user data, receiving verification data, and verifying the identity of a user based on the user data and the verification request data. The user data may include location data and/or identity data, and the user data may be received from a mobile device. The identity data may include biometric data regarding the user. The method, system, and computer-readable storage media may include comparing the user data to the verification request data. The method, system, and computer-readable storage media may also include performing an action based on the results of the verification wherein the action is authorizing a payment.

BRIEF DESCRIPTION OF THE DRAWINGS

The foregoing Summary, as well as the following Detailed Description, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
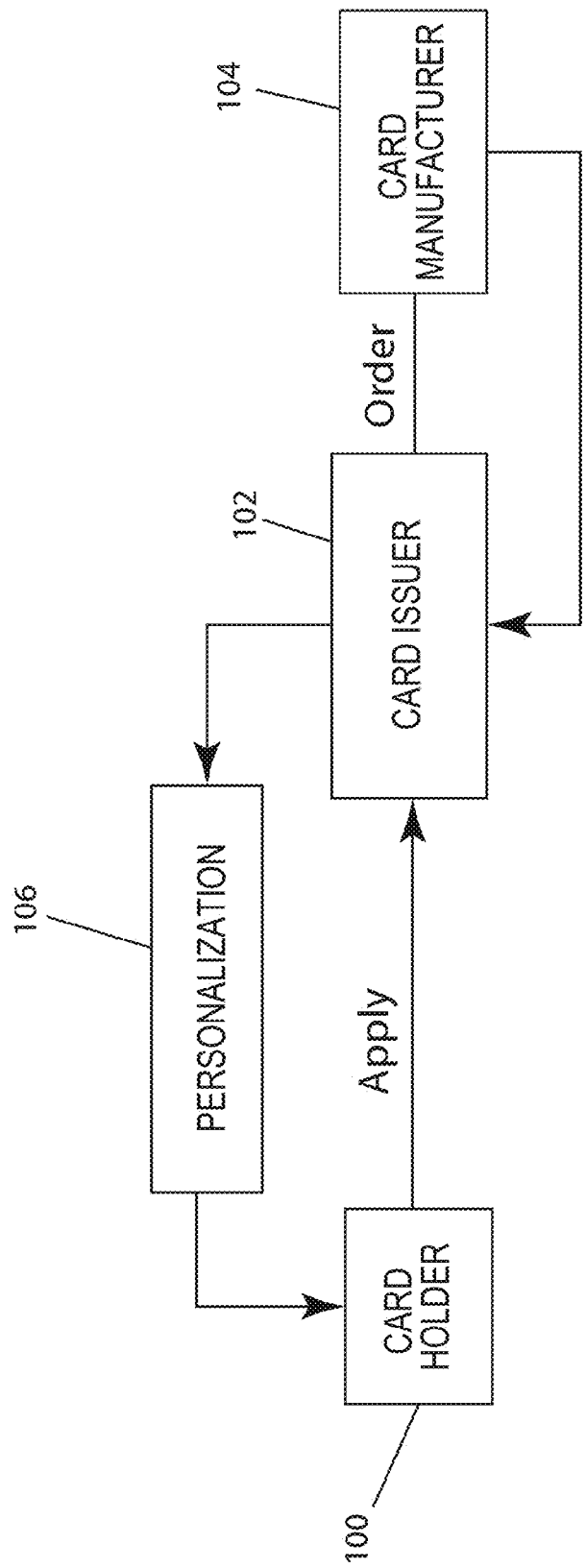
FIG. 1 is a block diagram of an exemplary method of provisioning transaction cards to consumers according to an embodiment of the present subject matter.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or the proposed 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store.

FIG. 1 is a block diagram of an exemplary process of provisioning transaction cards to consumers according to one embodiment of the present subject matter. In this example, a card holder 100 may apply for a transaction card from a card issuer 102 by completing an application and providing the necessary information requested by the card issuer 102. The card issuer 102 may then evaluate the application, and in response to determining that the application is approved, send the transaction card to card holder 100 after personalizing it 106. The transaction cards may be ordered by the card issuer 102 from a card manufacturer 104. The terms "card issuer" and "transaction card" and any similar terms are used herein in their broadest sense. Card issuer may include, but is not limited to retail, wholesale, or service businesses or financial institutions such as banks, credit unions, savings and loan associations, finance companies, stock brokerages, or asset management firms. Transaction card may include, but is not limited to, credit cards, debit cards, charge cards, and automatic teller machine cards. The personalization 106 of the transaction card may be done by the card issuer 102 or by an outside vendor, and it may include adding a name, account number, or other information as determined by the card issuer 102.

Figure 2:
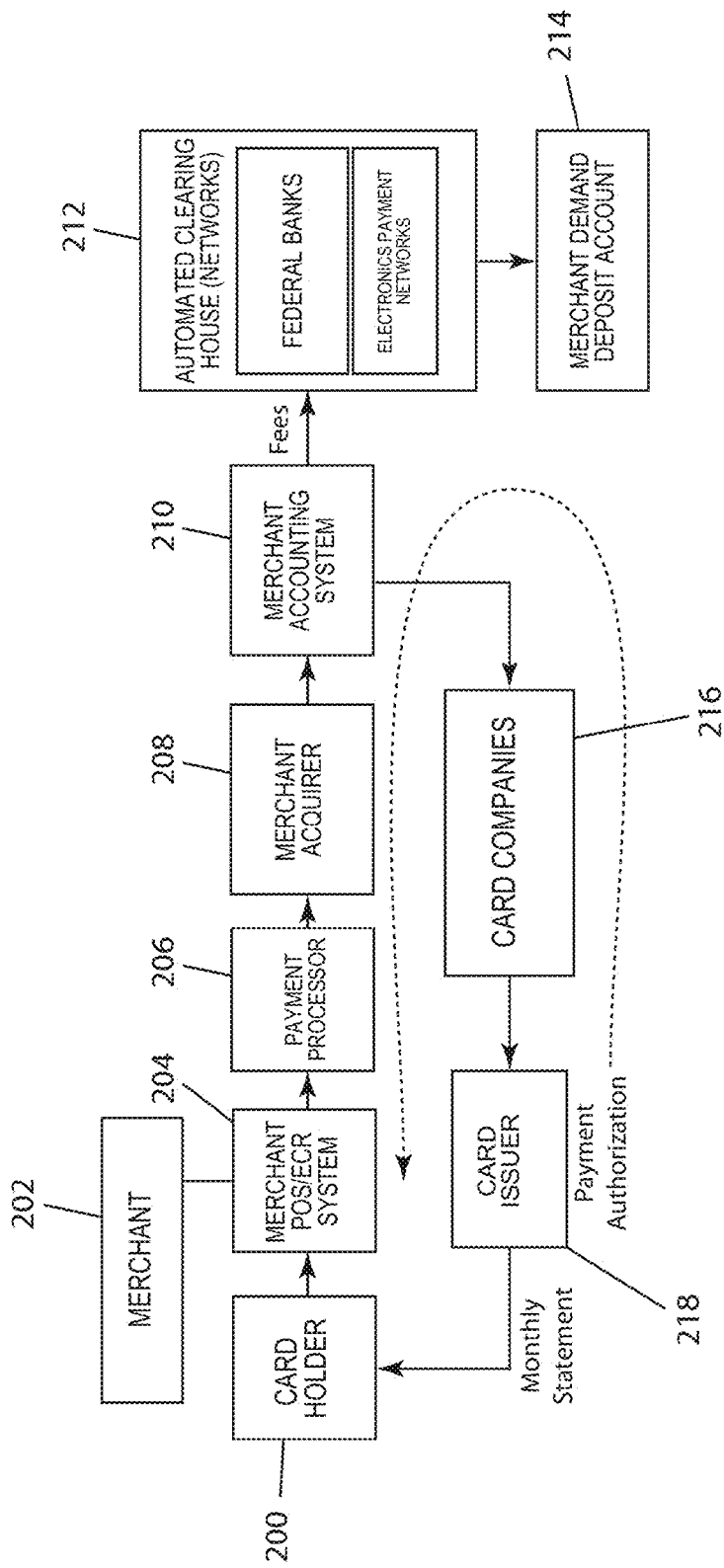
FIG. 2 is a block diagram of a simplified payment transaction according to an embodiment of the present subject matter.

FIG. 2 is a block diagram of an example payment transaction according to one or more embodiments of the presently disclosed subject matter. Referring to FIG. 2, a card holder 200 purchases a product or service from a merchant 202. The card holder 200 uses a transaction card that is processed using the merchant point of sale (POS)/electronic cash register (ECR) system 204. At the system 204, it is determined whether payment is authorized. In response to determining that payment is authorized, the transaction proceeds to a payment processor 206 and then to a merchant acquirer 208 who may send the transaction information to a merchant account system 210 that services that particular merchant's account. The merchant accounting system 210 distributes the transactions to the appropriate card companies 216, such as VISA®, MASTERCARD®, AMERICAN EXPRESS®, DISCOVER®, and the like, deducts the appropriate merchant fees from the transaction amount, and generates instructions for the automated clearing house (ACH) network 212 to remit the difference to the merchant's bank for deposit into the merchant demand deposit account 214. The transaction information is then sent from the card companies 216 to the card issuer 218. The card issuer 218 may bill the card holder 200 by sending the card holder 200 a monthly statement to collect the balance.

As part of the transaction process, the payment must be authorized by the card issuer 218. The payment authorization may involve the card issuer 218 conducting a series of checks for fraud and verifying that the card holder's available credit line is sufficient to cover the purchase before returning a response. The payment authorization process typically takes no more than a few seconds.

Figure 3:
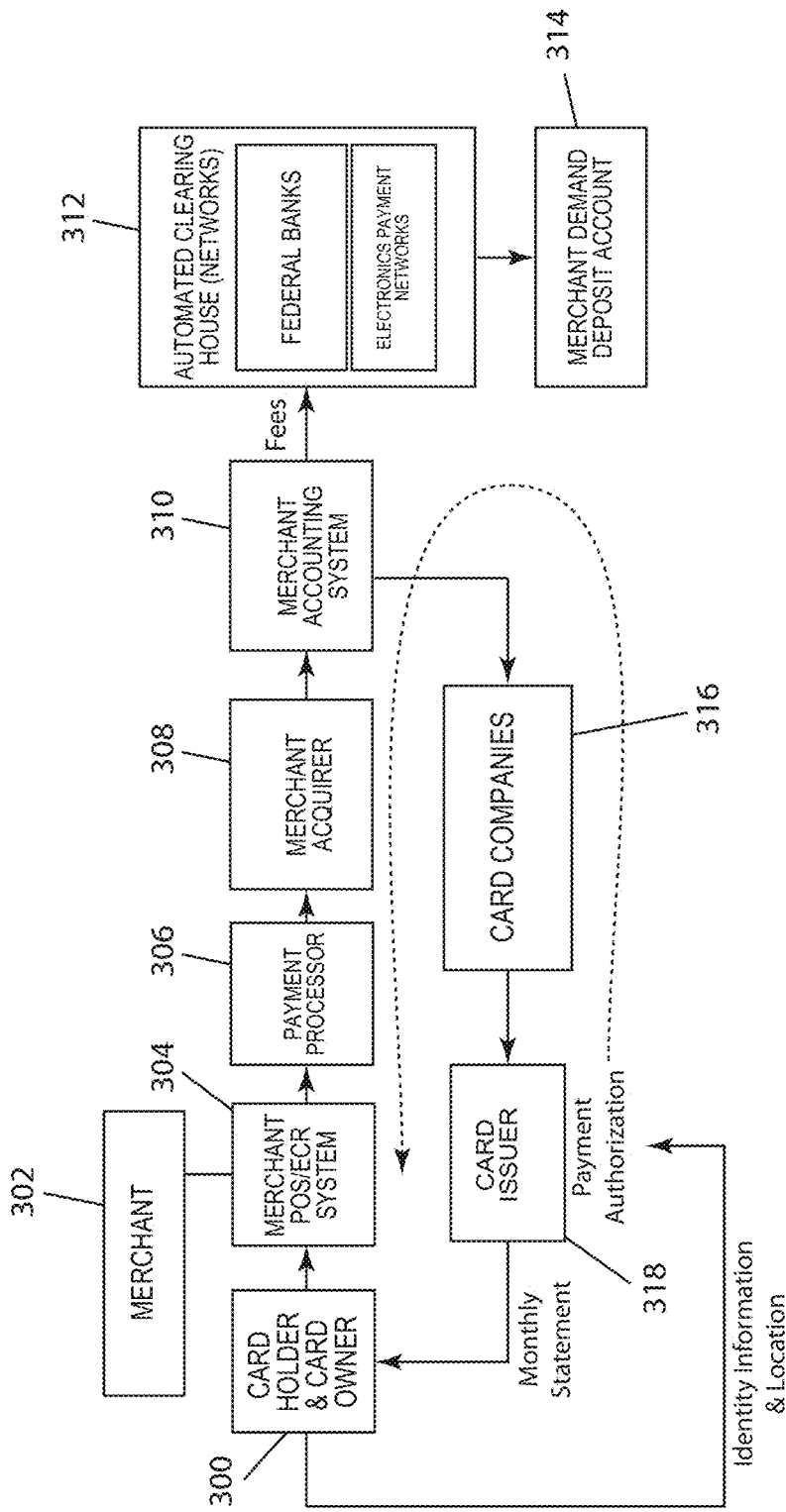
FIG. 3 is a block diagram of a simplified payment transaction using location-based identity verification according to an embodiment of the present subject matter.

FIG. 3 is a block diagram of an example payment transaction using location-based identity verification according to one embodiment of the present subject matter. Referring to FIG. 3, card holder and card owner 300 purchases a product or service from merchant 302. The card holder 300 uses a transaction card that is processed using the merchant POS/ECR system 304. In response to determining that the payment is authorized, the transaction proceeds to a payment processor 306 and then to a merchant acquirer 308 who may send the transaction information to a merchant account system 310 that services that particular merchant's account. The merchant accounting system 310 distributes the transactions to the appropriate card companies 316, deducts the appropriate merchant fees from the transaction amount, and generates instructions for the ACH network 312 to remit the difference to the merchant's bank for deposit into the merchant demand deposit account 314. The transaction information is then sent from the card companies 316 to the card issuer 318. The card issuer 318 bills the card holder 300 by sending the card holder 300 a monthly statement to collect the balance.

The payment must be authorized by the card issuer 318. An example payment authorization process is disclosed and described hereinabove, such as in the example of FIG. 2. The payment authorization process of FIG. 3 includes location-based identity verification according to one or more embodiments of the present subject matter. Location-based identity verification includes providing the card issuer 318 with user data in the form of location data and/or identity data regarding the card holder and card owner 300 in order to verify that the card holder is the card owner by comparing the location data and/or identity data of the card owner and card holder 300 to the verification request data provided by the merchant 302 for the transaction. Verification request data may include, but is not limited to, data regarding the details of the transaction and the location of the card holder and/or merchant.

In accordance with one or more embodiments, location data may be provided by a card owner's mobile device to a card issuer. For example, the card owner 300 may interact with an application residing on his or her mobile device to control the mobile device to wirelessly communication the location data to a computing device of the card issuer 318. Location data may include coordinates and/or identification of a city, state, country, and/or the like where the card owner will be traveling. Location data may be periodically or otherwise regularly transmitted.

In another example, a card owner's mobile device may automatically transmit location data to a card issuer. The location data may be periodically or otherwise regularly transmitted to the card issuer. In another example, the location data may be requested by a card issuer and transmitted to the card issuer in response to the request. For example, a computing device of the card issuer 318 may request location data from a mobile device of the card owner 300, and the mobile device of the card owner 300 may communicate the data to the computing device of the card issuer 318 in response to receipt of the request.

Location data may also be provided automatically by tracking the card owner's location using a mobile device. The mobile device may be any type of communications device capable of transmitting and receiving signals over a wireless network system. This may include traditional devices such as cellular telephones, personal communications systems, personal data assistants, conventional laptops, palmtop computers, tablet computers, or other similar devices. Location data provided by a mobile device may include, but is not limited to, Global Positioning System (GPS) or Assisted GPS data, indoor GPS within buildings, Wi-Fi triangulation location information, cell-tower proximity location and triangulation, and carrier assigned IP-based location. Identity data may be provided by the card owner 300 to the card issuer 318 by entering a personal identification number (PIN) or passcode into a mobile device of the card owner 300. Identity data may also be provided through a biometric engagement of the card owner 300 with a fingerprint scanner, voice recognition on a mobile device, or other similar devices. Additional identity data may be gathered from the mobile device such as mobile device model and unique serial number, subscriber identity module (SIM) number, or other attributes or pre-registered and carrier assignable mobile device information.

A mobile device of the card owner 300 may monitor and collect the location data and/or identity data and store it securely on the device. When requested by a computing device of the card issuer 318, the location data and/or identity data may be sent to the card issuer 318 in an encrypted format. Location data and/or identity data may be compared locally on the mobile device, and changes may be detected and reported to the card issuer 318. The location data and/or identity data is available for use by the card issuer 318 to manage fraudulent activity and minimize risk.

Figures 4A, 4B:
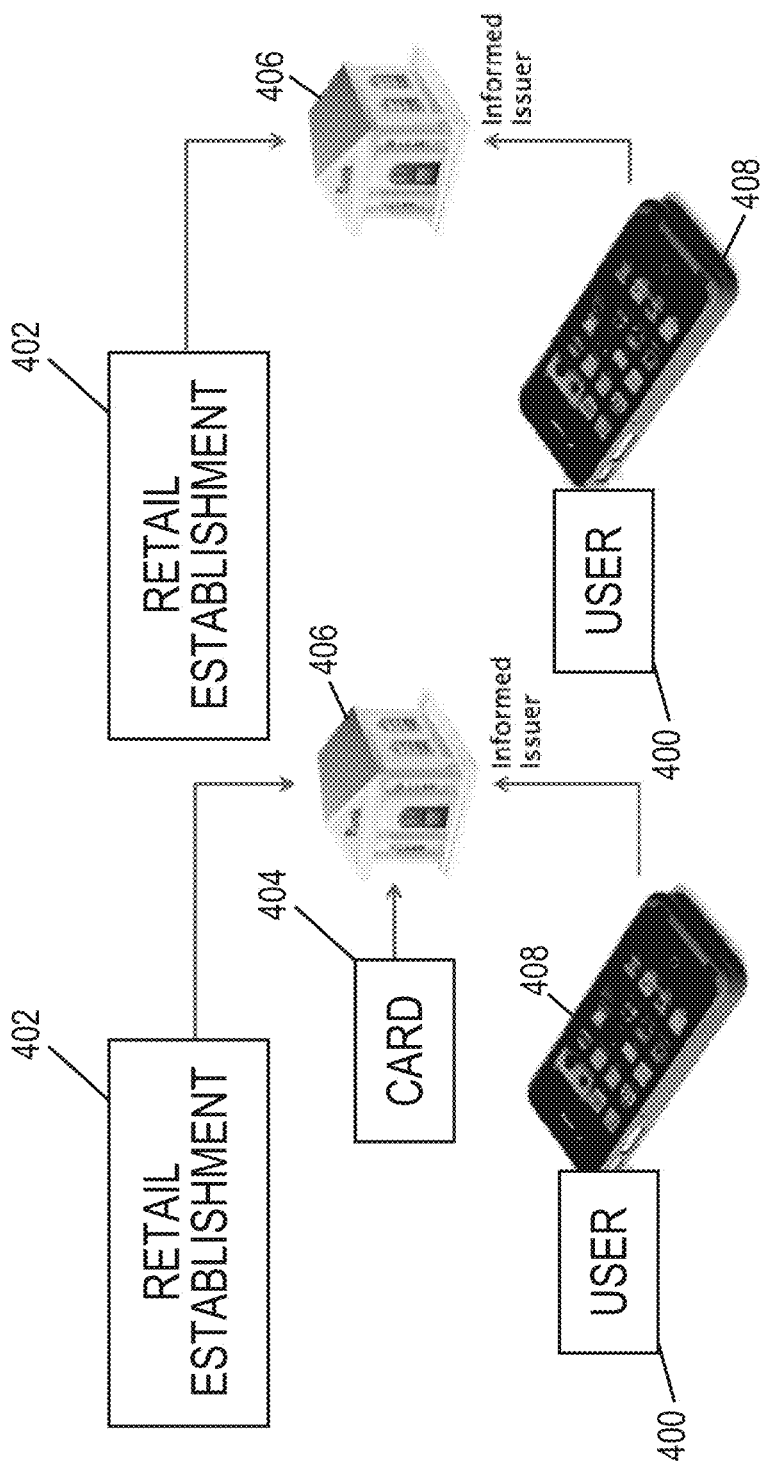
FIGS. 4A and 4B illustrate flow diagrams of example verification processes according to embodiments of the presently disclosed subject matter.

FIGS. 4A and 4B illustrate flow diagrams of example verification processes according to embodiments of the presently disclosed subject matter. Referring to FIG. 4A, the process may begin when a transaction is initiated. For example, an individual or user 400 may shop at a retail establishment 402, such as a store at a shopping mall. After collecting items for purchase, the user 400 may proceed to a point-of-sale (POS) terminal at the retail establishment where a purchase transaction can be processed. The user 400 may present his or her transaction card 404 (e.g., a credit card or debit card) to store personnel at the POS terminal for conducting the purchase transaction.

When a transaction is initiated, the store personnel may collect identification information from the transaction card 404 for communicating a payment authorization request to a card issuer 406. For example, a scanner of the POS terminal may be used to scan a magnetic stripe of the transaction card 404. In another example, the store personnel may manually enter a card number identified on the transaction card 404 into the POS terminal. After the identification information has been collected, the POS terminal and/or other computing equipment at the retail establishment 402 may send a payment authorization request, including the identification information and other verification request data, to computing equipment of the card issuer 406.

In accordance with embodiments of the present disclosure, verification request data may include location information for the retail establishment 402. For example, the location information may identify coordinates and/or identification of a city, state, country, and/or the like of the retail establishment 402. Alternatively, for example, the location information may identify the retail establishment 402, and the card issuer 406 may search a database including information that associates the identified retail establishment with coordinates and/or identification of a city, state, country, and/or the like of the retail establishment 402.

FIG. 4B provides an alternative example to using a transaction card as in the example of FIG. 4A. In this example, the user 400 may utilize a virtual (soft) card in the form of a mobile wallet as part of a mobile device 408. For example, an application residing on the mobile device 408 may implement functionality of a mobile wallet. The mobile wallet function may implement payment service features similar to a transaction card. The mobile wallet may be associated with a financial institution and may include financial account identification information for use in conducting a transaction at a retail establishment, such as the retail establishment 402. In this example when a transaction is conducted, the user 400 may use the mobile wallet to provide identification information to the POS terminal of the retail establishment 402. The POS terminal may use the identification information to conduct a purchase transaction. Particularly, the POS terminal or other computing equipment at the retail establishment 402 may communicate verification data, including the identification information from the mobile wallet and location information of the mobile device 408, to the card issuer 406 for initiation of the purchase transaction.

In both the examples of FIGS. 4A and 4B, verification request data provided by the retail establishment 402 to the card issuer 406 may provide the card issuer 406 with a current location of the user 400 attempting to conduct the purchase transaction at the retail establishment 402. This is because the location of the retail establishment 402 can be verified by information provided by the retail establishment 402. The location information may be based on information provided by computing equipment of the retail establishment 402 and/or the mobile wallet on the mobile device 408. Using the location data and/or identification data provided by the mobile device 408, the card issuer 406 can verify the identity of the user 400 by comparing the location where the transaction is being attempted (i.e., the location of the retail establishment 402) with the location reported by the mobile device 408 of the user 400. Particularly, computing equipment of the card issuer 406 may determine whether the two locations match or are substantially the same. In response to determining that the two locations match or are substantially the same, the computing equipment of the card issuer 406 may authorize that the purchase transaction proceed and may report this authorization to computing equipment of the retail establishment 402.

Figure 5:
FIG. 5 illustrates a diagram of an example verification process for a transaction card according to embodiments of the presently disclosed subject matter.

FIG. 5 illustrates a diagram of an example verification process for a transaction card according to embodiments of the presently disclosed subject matter. Referring to FIG. 5, a user or owner of a mobile device 500 may be located in San Jose, Calif. The mobile device 500 may include a mobile wallet application. In this example, a financial card 502 owned by the user may be wrongfully carried by another in Las Vegas, Nev. The holder of the financial card 502 may attempt to use the financial card 502 at retail establishment for conducting a fraudulent purchase transaction in Las Vegas. Computing equipment of the retail establishment may obtain identification information from the financial card 502. Subsequent to obtaining the identification information, the identification information and location information may be communicated to a card issuer, such as the card issuer 406 shown in FIGS. 4A and 4B, that provided the card 502 to the owner, who is now located in San Jose. The mobile device 500 of the card owner may provide location information of the mobile device 500 that indicates that the card owner is located in San Jose.

Computing equipment of the card issuer may compare the location information of the mobile device 500 and the location information of the retail establishment where use of the card 502 is being attempted. The computing equipment of the card issuer may determine whether the locations are the same or similar. In response to determining that the locations are the same or similar, the computing equipment may provide a communication to the retail establishment for authorizing the purchase transaction. In response to determining that the locations are not the same and not similar, the computing equipment may provide a communication to the retail establishment for declining the purchase transaction. In this way, the owner of the card 502 may be protected from fraud by comparing the location of the mobile device 500 to the card 502. Further, in response to determining that the locations are not the same or similar, the computing equipment may communicate an alert to the mobile device 500 for indicating a fraudulent purchase attempt. In response to the alert, the user of the mobile device 500 may input instructions for approving the purchase transaction. In this case, the card issuer may communicate authorization to the retail establishment.

In an alternative embodiment, a card issuer may use the location data and/or identity data to prevent a fraudulent soft card request. When issuing a soft card to a card owner based on a card owner's request, location data and/or identity data regarding the request may be attached and securely sent to the card issuer. The soft card may then be issued if the card owner is in an acceptable location and is using a validated and preregistered mobile device. If the location data and/or identity data cannot be verified by the card issuer, the card owner may be prompted in real time for a personal identification number (PIN), passcode, or biometric identification. Location data and/or identity data may also be used to verify a card owner when a request for a soft card is initiated by a third party.

In an alternative embodiment, the card owner's mobile wallet may send the card issuer of the card owner's location any time the mobile device is turned on and/or the mobile wallet application is opened. If the mobile wallet is in an unknown or unacceptable location the wallet may be locked or the card issuer may require the card owner to provide a PIN, passcode, or biometric identification.

In an alternative embodiment, the mobile wallet may send location data and/or identity data to a payment terminal/reader during a near field communications (NFC)-redemption to enrich the transaction and provide a more secure transaction.

In accordance with embodiments of the present disclosure, an owner of a transaction card may actively inform a card issuer that the owner is traveling or will be using the card in a different location. For example, the user may use a mobile wallet residing on his or her mobile device for controlling the mobile device to determine a current location and to communicate the current location information to a card issuer. In this way, the card issuer may store the location information for use later for comparison to a location of attempted use of a transaction card. In an example, the mobile phone may detect that the user is in a different location (e.g., different city), and in response, the mobile phone may prompt the user to authorize reporting of the different location to the card issuer.

In accordance with embodiments of the present disclosure, an owner of a transaction card may define or specify in his or her mobile device a number of times within a time period that his or her transaction card may be authorized for use for purchase transactions. In this way, his or her exposure to risk of fraudulent use of the transaction card may be limited. As an example, the owner may interact with the mobile device to enter the number of times and the time period (e.g., number of hours or days). This information may be communicated to a card issuer for use in limiting purchase transactions with the card in accordance with the defined number of use and time limits. Such a feature may be useful, for example, when the owner is traveling to high risk areas. Further, for example, the owner may define an amount of spending over a defined time period. Such spending limits may be based on, for example, a maximum amount per transaction, a maximum amount in a time period (e.g., a day), and an overall spending limit on an account.

In accordance with embodiments of the present disclosure, purchase transaction related activity may be monitored for determining whether the associated account is to be identified as a high risk account. For example, an owner of a transaction card may specify criteria (e.g., spending amount within a time period) which is used to determine whether the account should be treated as a high risk account. If the specified criteria are met, the account is identified as a high risk account. In an example, if the account is identified as high risk, purchases by the associated transaction card may be declined for purchases at particular high risk merchants. Such transaction may be allowed if permission is verified by an owner either over a telephone or via mobile device authorization as described herein. In another example, if a transaction is initially declined, an owner may request that the purchase transaction be verified via a mobile payment application. In this example, the owner may enter a password in his or her mobile device for verifying the transaction. Alternatively, for example, the owner may answer one or more questions via his or her mobile phone and the purchase transaction allowed in response to the question(s) being answered correctly.

In an embodiment, a change of location of a mobile device of a user from a first location to a second location may be determined. For example, this may be implemented at a mobile server. In response to detecting the change of location, the server may request confirmation of the change of location from the mobile device. Subsequently, the mobile device may receive the request and display an interface to ask for verification from the user. The user may enter verification request data, such as user name and password information, to verify that he or she is authorized. Upon authorization, a purchase transaction may be implemented in accordance with embodiments of the present disclosure.

While the embodiments disclosed and described herein primarily pertain to transaction cards issuers, the present subject matter may also be utilized by issuers of various types of plastic and/or soft cards including, but not limited to, prepaid cards, loyalty cards, offers, vouchers, coupons, transit tickets, entertainment tickets, stored value tickets, driver's license, passports, identification cards, travel documents, other secure documents issued by authorities, medical insurance cards, pharmacy card, automobile insurance cards, and club memberships.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for using location data in a soft card issuance transaction, the method comprising:
   using at least one processor and memory for:
      receiving a request for issuance of a soft card, the request having a user data including location data securely attached to the request;
      determining, based on the location data, whether a location of a prospective card owner is an acceptable location;
      in response to determining that the location of the prospective card owner is an acceptable location, issuing the soft card to the prospective card owner; and
      in response to determining that the location of the prospective card owner is not an acceptable location, prompting the prospective card owner in real time for a personal identification number (PIN), a passcode, or biometric identification information.

2. The method of claim 1, wherein the user data includes identity data.

3. The method of claim 2, wherein the identity data comprises biometric data regarding the user.

4. The method of claim 1, further comprising receiving the user data from a mobile device.

5. The method of claim 1, further comprising:
   receiving an indication of a predetermined number of times within a time period that the soft card is authorized for use;
   determining whether the predetermined number of times of authorized use within the time period has been exceeded; and
   in response to determining that the predetermined number of times of authorized use within the time period has been exceeded, declining another attempted use of the soft card.

6. The method of claim 1, further comprising:
   receiving user-input specifying criteria for treating an account associated with the soft card as a high risk account;
   determining whether the specified criteria are met; and
   in response to determining that the specified criteria are met, declining an attempted use of the soft card.

7. The method of claim 1, further comprising:
   receiving user-input specifying criteria for treating an account associated with the soft card as a high risk account;
   determining whether the specified criteria are met;
   in response to determining that the specified criteria are met, alerting the user that the specified criteria are met;
   receiving response of the user to one of authorize and decline an attempted use of the transaction card; and
   one of authorizing and declining the attempted use based on the response of the user.

8. The method of claim 1, further comprising receiving, from a mobile device of a user, user specification of the location data for specifying where the user is to be traveling.

9. The method of claim 1, further comprising:
   determining a change of a location of a mobile device of a user from a first location to a second location; and
   requesting confirmation of the change of location from the mobile device.

10. The method of claim 1, further comprising receiving confirmation of the change of location from the mobile device, wherein the confirmation includes the verification request data.

11. A computing device for using location data in a soft card issuance transaction, the computing device comprising:
    at least one processor and memory configured to:
       receive a request for issuance of a soft card, the request having user data including location data securely attached to the request;
       determining, based on the location data whether a location of a prospective card owner is an acceptable location;
       in response to determining that the location of the prospective card owner is an acceptable location, issuing the soft card to the prospective card owner; and in response to determining that the location of the prospective card owner is not an acceptable location, prompting the prospective card owner in real time for a personal identification number (PIN), a passcode, or biometric identification information.

12. The computing device of claim 11, wherein the user data includes identity data.

13. The computing device of claim 12, wherein the identity data comprises biometric data regarding the user.

14. The computing device of claim 12, further comprising receiving the user data from a mobile device.

15. The computing device of claim 11, wherein the at least one processor and memory are configured to receive, from a mobile device of a user, user specification of the location data for specifying where the user is to be traveling.

16. The computing device of claim 11, wherein the at least one processor and memory are configured to:
  determine a change of a location of a mobile device of a user from a first location to a second location; and
  request confirmation of the change of location from the mobile device.

17. The computing device of claim 11, wherein the at least one processor and memory are configured to receive confirmation of the change of location from the mobile device, wherein the confirmation includes the verification request data.

18. A non-transitory computer-readable medium having computer program code embodied thereon, the computer program code for using location data in a soft card issuance transaction, the computer program code comprising:
  instructions for receiving a request for issuance of a soft card, the request having user data including location data securely attached to the request;
  instructions for determining, based on the location data, whether a location of a prospective card owner is an acceptable location;
  instructions for, in response to determining that the location of the prospective card owner is an acceptable location, issuing the soft card to the prospective card owner; and
  in response to determining that the location of the prospective card owner is not an acceptable location, prompting the prospective card owner in real time for a personal identification number (PIN), a passcode, or biometric identification information.

19. The non-transitory computer-readable medium of claim 18, wherein the user data includes identity data.

20. The non-transitory computer-readable medium of claim 19, wherein the identity data comprises biometric data regarding the user.

21. The non-transitory computer-readable medium of claim 18, wherein the computer program code further comprises instructions for receiving the user data from a mobile device.

* * * * *